May 14, 1968     J. W. PETTY     3,383,201

RECOVERY OF PRECIOUS METALS

Filed March 1, 1967

JACK W. PETTY
INVENTOR.

KENDRICK, SUBKOW and STOLZY
BY
ATTORNEYS

United States Patent Office 3,383,201
Patented May 14, 1968

3,383,201
RECOVERY OF PRECIOUS METALS
Jack W. Petty, 1115 Arbor Dell Road,
Los Angeles, Calif. 90041
Continuation-in-part of application Ser. No. 470,472,
July 8, 1965. This application Mar. 1, 1967, Ser.
No. 619,663
12 Claims. (Cl. 75—83)

ABSTRACT OF THE DISCLOSURE

A method of recovering precious metals from oil shale by driving oily vapors from the shale and percolating them through a chamber containing a molten bath of at least one cyanide salt.

CROSS REFERENCES TO RELATED APPLICATIONS

This application is a continuation-in-part of copending application Ser. No. 470,472 for "Recovery of Precious Metals," filed by me July 8, 1965. The benefit of the filing date of said copending application is therefore hereby claimed for this application.

BACKGROUND OF THE INVENTION

This invention relates to the recovery of precious metals from oil shales (Kerogen), tar sands, natural petroleum, and carbonaceous material. When "oil shales" are mentioned hereinafter, tar sands, natural petroleum and other carbonaceous materials are included in this phrase.

It is known that gold, silver, platinum and other precious substances, including, for example, sea water, coal, oil shale, and, in deed, elsewhere. However, in all such cases heretofore known, the cost of recovery of such precious metals far outweighs the values obtained and this would, indeed, continue to be the case in most such instances even were the price of gold to be doubled or tripled. One mode of occurrence of gold is in the oleogenic constituents (Kerogen content) or volatile portion of oil shales, as described, for example, in United States Bureau of Mines Report of Investigations, No. 2413, of November 1922. The methods heretofore known, however, by which gold might be recovered from oil shale, including the work reported in the aforesaid report, are inherently so costly that an economic recovery of gold and silver therefrom is not possible.

SUMMARY OF THE INVENTION

In accordance with the present invention, it has been discovered that percolating vapors from heated oil shale through a molten bath of a cyanide salt aids in the recovery of precious metal values from the bath.

An object of the present invention is to provide a process for recovering gold and silver from oil shale, tar sands, natural petroleum and carbonaceous material, and to provide exemplary apparatus for use in the process.

Another object of the invention is to provide a process as aforesaid leading to recovery costs considerably less than the value of the gold and silver so recovered.

Other objects of the present invention will become apparent as the description of the invention proceeds.

DESCRIPTION OF THE PREFERRED EMBODIMENTS

Generally speaking, and in accordance with illustrative embodiments of my invention, I heat oil shale to be treated, said oil shale containing some gold and silver values, to a sufficient temperature that the organic matter thereof is driven off. In general, this step of the process corresponds to many known methods of recovering oil from oil shale by heating, and in such a manner that the bulk of the organic matter is volatilized. The volatilized organic matter from the oil shale, which in the ordinary case will be largely various constituents of petroleum oil, is passed through a bath of a molten alkali metal cyanide or alkaline earth metal cyanide or mixtures thereof. The gold and silver values in the volatilized oily constituents from the oil shale are dissolved by the molten cyanide in the passage therethrough, and are recovered by subsequently dissolving the cyanide in water and subjecting the solution thus obtained to any standard, known gold and silver recovery step from a cyanide solution. The spent cyanide solution is dehydrated, for example, by evaporation, and the cyanide is then melted and recirculated to the molten bath perfused by the oil vapors as aforesaid.

In accordance with a further and optional aspect of my invention, I incorporate air in the molten cyanide bath, whereby it aids in the solution of the gold and silver, and in accordance with a still further aspect of my invention, I may use the air so added as a means or auxiliary means, as the case may be, for effecting circulation of the molten cyanide throughout my apparatus. In accordance with still further aspects of my invention, I may substitute other oxidizing agents for the air or use them or mixtures of them conjointly with the air. The oil vapors subsequent to their passage through the cyanide bath are then led to a suitable device for the recovery of the petroleum values therein. Thus, my invention may be considered as a novel intermediate step in known methods of recovery of oil from oil shale, being interposed between the oil shale retort and the oil vapor condenser in such a known apparatus. The spent oil shale is fully as useful as it is in conventional oil shale treatments; and, likewise, the recovered oil is fully as valuable as it would be had my invention not been supplied to any given oil shale recovery process. However, in accordance with my invention, the oil is caused to give up its burden of gold and silver, and other precious metals, which otherwise would be lost to any economic utilization because it would simply be carried along with the oil and ultimately be dissipated in the fuel, lubricants, and the like made from the oil.

Figure 1:
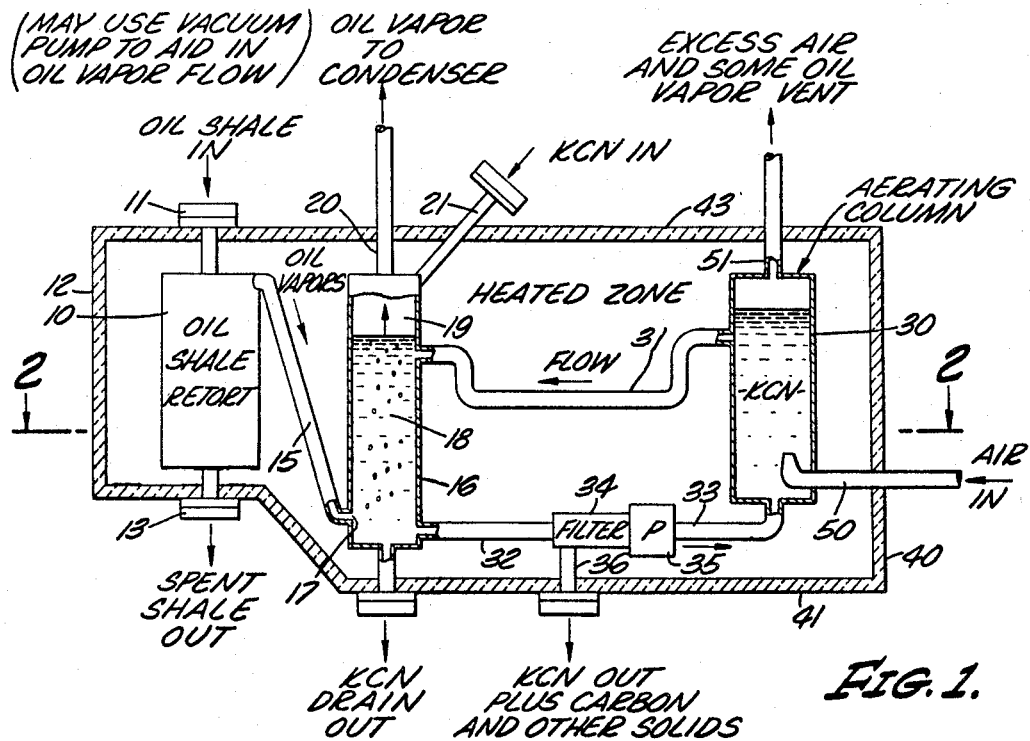
FIG. 1 is an elevational view, partly broken away and partly schematic, showing an apparatus useful in my process.
Figure 2:
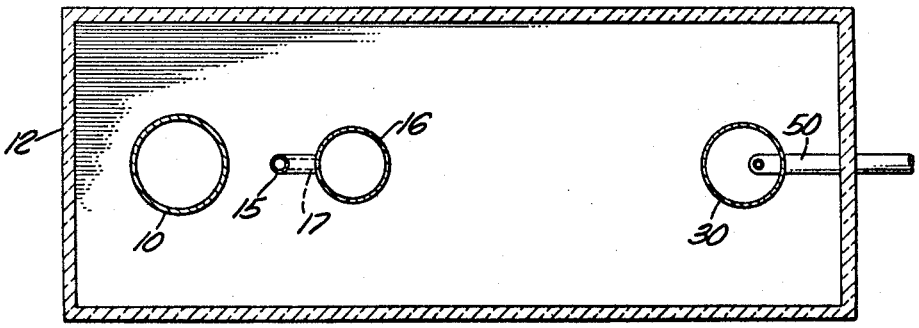
FIG. 2 is a transverse sectional view of the apparatus.

Referring now to FIG. 1, 10 designates an oil shale retort of conventional types. Many such have been developed, and reference may be made to the extensive work by the United States Bureau of Mines published in various of their reports of investigations, especially during the 1930's, 1940's and 1950's. A representative report is Report of Investigation No. 4771, which shows typical installations, analyses, and the like. It will be understood, therefore, that retort 10 in the drawing is essentially schematic and need not be further detailed. 11 designates a point of entry into the retort for raw oil shale and 13 the point of exit for spent shale after retorting. Successful oil shale retorts are generally continuous devices.

Oil vapors are drawn off in the retort, generally in the neighborhood of 850° F. to 1500° F. or more, depending upon the particular shale and operating conditions, and are shown issuing from the retort 10 through a vapor conducting tube 15 which leads into the bottom of the molten cyanide bath 16, which is essentially a stripping tower for the oil vapors. The latter enters the bottom of the bubble column at input point 17, traveling upwards through the molten cyanide 18 contained in the column or tower, entering then a top portion 19 thereof above the level of the molten cyanide bath, so that any entrained droplets of cyanide will have an opportunity to fall back into the bath, and exit through vapor exit 20, which leads to any suitable type of condenser as used in the oil shale recovery methods already known and therefore which need not be detailed herein. The cyanide column 16 also contains an input 21 for adding additional make-up for replacement quantities of cyanide.

At one side of the cyanide column 16, and approximately at an equal level or higher, is an aerating column 30, which is connected at the upper portion thereof with the upper portion of column 16 by a flowline 31, and likewise is connected at the bottom of column 16 with flowlines 32 and 33, between which is interposed a filter 34 and pump 35. It will be appreciated that the cyanide in column 16 and also in column 30 and in the intermediate flowlines is maintained above its melting point so that the cyanide, or cyanide mixture employed, although virtually anhydrous, is always in a liquid condition. Inasmuch as oil vapors at about 850° F. to 1500° F., which is well above the melting point of the cyanide or cyanide mixture employed, are continuously passing through the cyanide column 16, I need not necessarily provide continuous heating arrangements for the apparatus already described in connection with my cyanide circuit, viz., the two columns, flowlines, and the filter and pump, but it suffices to enclose the apparatus in a common enclosure with the retort, which I have indicated in the drawing, somewhat schematically, comprising heat insulating walls 40, 41, 12 and 43. Indeed, it is not always necessary to include the retort itself within the enclosure, since the oil vapors provide a sufficient supply of heat provided that adequate provision for preventing heat loss by convection and radiation has been made. It may, in fact, be desirable to heat the retort and cyanide circuit separately.

Turning now to aerating column 30, it will be observed that I provide an air input near the bottom with an air vent 51 near the top thereof. The air introduced in this fashion partially dissolves in the cyanide and tends to circulate the molten cyanide through flowpipe 31 into the top of column 16, returning through pipes 32 and 33. However, the action of the oil vapors passing upwardly through column 16 tends to some extent to counteract this flow, and find it convenient to utilize pump 35 to maintain circulation in the desired direction, that is, upwardly in aerating column 30 and downwardly in stripping column 16. In this fashion, I obtain countercurrent flow of the oil vapors and of the molten cyanide in stripping column 16.

Either continuously or batch-wise, I withdraw cyanide from some convenient point of the system, most suitably from filter 34 through flowline 36, and treat this cyanide, which contains its burden of gold and silver by conventional methods for recovering gold and silver therefrom. Such methods are well known and need not be described herein. The cyanide is recovered from the gold and silver extraction processes and returned to the system, convieniently at input 21.

Now, I prefer utilizing ordinary potassium cyanide, which has a melting point of about 1170° F., but sodium cyanide is equally suitable and has the advantage of a low-melting point of about 1050° F. Mixtures of the two may also be used, and will in general exhibit an even lower melting point. An equal weight mixture of potassium cyanide and sodium cyanide has a melting temperature of approximately 850° F.

I may supplement or supplant the action of the air by small additions, of the order of one-tenth of one percent or so, of oxidizing salts such as sodium or potassium peroxide, sodium or potassium permanganate, or the like, which may be added through input pipe 21 as needed or simply incorporated with the replacement cyanide. To control pH and molten salt temperature, modifying salts such as NaCl, KCl, KOH, NaOH, $Na_2CO_3$, LiCl, $CaCl_2$, $BaCl_2$ and other similar salts may be added.

The filter 34 has the function of removing carbon, coke, adventitious mineral particles, and the like which may enter the system for the retort. In general, the requirements of such a filter are not at all critical; and, indeed, it may be omitted entirely when the retort itself is very efficient.

The economics of the inventive process are attractive. For example, Colorado Shale Oil has a gold and silver content of approximately fifty cents per barrel. Brea, California, natural petroleum approximately twenty-five cents per barrel, and Santa Maria, California, tar sands approximately forty-six cents per barrel. It is my experience that when proceeding in accordance with the invention, a substantial proportion of the gold and silver contained in the Kerogen content of the oil shale appears in the oily vapors issuing from the retorting process, and in turn, a substantial portion of that is captured by the molten cyanide and eventually made available as saleable metallic gold and silver. It may be observed that my inventive process may be carried out with no real interference with conventional methods for recovering oil from oil shale, and from the standpoint of heat consumption, the operating costs are low indeed. The cyanide can readily be recovered substantially completely from the step wherein the gold and silver is extracted from the cyanide bath so that make-up quantities from the system as a whole are low. It will be appreciated that my process is equally adaptable to processes in which oil shale is retorted and the oil therefrom is not necessarily recovered as a valuable constituent per se. This may occur with oil shales of high gold and silver content and relatively undesirable oily constituents, or where the retorted shale is the primary product of the process, being useful, for example, as a lightweight aggregate for concrete or for solid fuel.

It should be kept in mind that while I have described my invention with the aid of numerous specific embodiments, many variations are possible in the details of proportions, operating temperatures, specific arrangements of components, and the like, and that my invention is a broad one, limited only by the scope of the claims which follow.

I claim:

1. In a process wherein a precious metal bearing oil shale is heated so as to drive off hot, oily vapors therefrom, the steps which comprise passing said vapors through a chamber containing a molten bath of at least one cyanide salt, and subsequently recovering precious metal values from said bath.

2. The process in accordance with claim 1 wherein said bath is selected from the group consisting of alkali metal cyanides and alkaline earth metal cyanides and mixtures thereof.

3. The process in accordance with claim 1 wherein said bath contains an oxidizing agent.

4. The process in accordance with claim 3 wherein said oxidizing agent is air.

5. In a process wherein precious metal bearing oil shale is heated so as to drive off hot, oily vapors therefrom, the steps which comprise passing said vapors through a chamber containing a bath of at least one molten cyanide salt, simultaneously circulating said bath through a second chamber, simultaneously adding an oxidizing agent to said bath in said second chamber, and recovering precious metal values from said bath subsequent to its contact with said vapors.

6. The process in accordance with claim 5 wherein said oxidizing agent is air.

7. The process in accordance with claim 5 in which said bath is molten potassium cyanide.

8. The process in accordance with claim 7, in which said oxidizing agent is air.

9. The process in accordance with claim 5, in which said bath is molten sodium cyanide.

10. The process in accordance with claim 9, in which said oxidizing agent is air.

11. The process in accordance with claim 5, in which said bath includes a mixture of potassium cyanide and sodium cyanide, and wherein said bath is maintained at a temperature of at least 850° F.

12. The method of recovering a precious metal comprising the steps of: passing an oily vapor containing the precious metal through a molten bath containing at least one cyanide salt; and subsequently recovering the precious metal values from said bath.

References Cited

UNITED STATES PATENTS

| | | | |
|---|---|---|---|
| 3,150,960 | 9/1964 | Hunter | 75—118 |
| 3,238,038 | 3/1966 | Hunter | 75—83 |

HYLAND BIZOT, *Primary Examiner.*

RICHARD O. DEAN, *Examiner.*

UNITED STATES PATENT OFFICE
CERTIFICATE OF CORRECTION

Patent No. 3,383,201                                  May 14, 1968

Jack W. Petty

It is certified that error appears in the above identified patent and that said Letters Patent are hereby corrected as shown below:

Column 1, line 35, before "substances" insert -- metals occur in relatively small quantities in various --; line 36, "in deed" should read -- indeed --. Column 3, line 45, after "and" insert -- I --; lines 58 and 59, "convieniently" should read -- conveniently --.

Signed and sealed this 2nd day of December 1969.

(SEAL)

Attest:

Edward M. Fletcher, Jr.                        WILLIAM E. SCHUYLER, JR.
Attesting Officer                                    Commissioner of Patents